(12) United States Patent
Bar-Niv

(10) Patent No.: US 8,112,572 B2
(45) Date of Patent: Feb. 7, 2012

(54) APPARATUS FOR SWAPPING HIGH-SPEED MULTIMEDIA SIGNALS

(75) Inventor: Amir Bar-Niv, Sunnyvale, CA (US)

(73) Assignee: TranSwitch Corporation, Shelton, CT (US)

( * ) Notice: Subject to any disclaimer, the term of this patent is extended or adjusted under 35 U.S.C. 154(b) by 527 days.

(21) Appl. No.: 12/260,419

(22) Filed: Oct. 29, 2008

(65) Prior Publication Data

US 2010/0107212 A1      Apr. 29, 2010

(51) Int. Cl.
*G06F 13/00* (2006.01)
*H04J 3/16* (2006.01)

(52) U.S. Cl. ......... 710/316; 710/106; 710/313; 370/465

(58) Field of Classification Search ................... 710/105, 710/106, 305, 306, 311, 316, 317; 370/465
See application file for complete search history.

(56) References Cited

U.S. PATENT DOCUMENTS

| | | | |
|---|---|---|---|
| 2007/0206643 A1* | 9/2007 | Egan et al. | 370/479 |
| 2008/0050951 A1* | 2/2008 | Wu | 439/108 |
| 2008/0205519 A1* | 8/2008 | Goodart et al. | 375/240.12 |
| 2008/0246626 A1* | 10/2008 | Sheafor et al. | 340/825.21 |
| 2009/0147864 A1* | 6/2009 | Lida et al. | 375/257 |
| 2009/0260869 A1* | 10/2009 | Wang | 174/350 |
| 2010/0084157 A1* | 4/2010 | Wang | 174/107 |

* cited by examiner

*Primary Examiner* — Khanh Dang
(74) *Attorney, Agent, or Firm* — Myers Wolin, LLC

(57) ABSTRACT

An apparatus for swapping output high-speed multimedia signals. In one embodiment the apparatus comprises a plurality of inputs coupled to a multimedia transmitter; a plurality of outputs coupled to a plurality of pins of a multimedia interface connector; and a controller for generating a control signal for configuring an order in which the plurality of inputs are routed to the plurality of outputs, wherein the order in which the plurality of inputs are routed to the plurality of outputs is set to enable un-crossing of one or more conducting wires coupling the plurality of inputs to the multimedia transmitter and to enable un-crossing of one or more conducting wires coupling the plurality of outputs and the plurality of pins of the multimedia interface connector.

14 Claims, 8 Drawing Sheets

APPARATUS FOR SWAPPING HIGH-SPEED MULTIMEDIA SIGNALS

TECHNICAL FIELD

This invention generally relates to the connectivity of multimedia interface devices.

BACKGROUND OF THE INVENTION

The high-definition multimedia interface (HDMI™) is a compact audio/video connector interface for transmitting uncompressed digital streams. The HDMI connects digital audio/video (or multimedia) sources (e.g., a set-top box, a DVD player, a personal computer, a video game console, etc.) to a compatible digital audio device and/or video monitor such as a digital television.

An exemplary block diagram of an HDMI link 100 is shown in FIG. 1. A multimedia source 110 transmits high speed data using transition minimized differential signaling (TMDS®) characters. The TMDS characters are high-speed signals encapsulating video, audio, and auxiliary data and are carried over three TMDS channels 130-1, 130-2, and 130-3. A multimedia sink 120 receives the TMDS characters and converts them into digital video and audio streams, data packets, and control signals.

A clock, typically running at the video pixel rate, is transmitted on a clock channel 140 and is used by the multimedia sink 120 as a frequency reference for data recovery on the three TMDS channels 130-1, 130-2, and 130-3. In addition, configuration, system-level control, management and status information is exchanged between the multimedia source 110 and the multimedia sink 120. The system-level control includes a display data channel (DDC) and a consumer electronics control (CEC) which are transmitted over channels: SCL 150, SDA 160, and CEC 170. Signals transported over the SCL 150, SDA 160, and CEC 170 channels are considered as low-speed signals. A hot plug detector (HPD) signal 180 is sent from the multimedia sink 120 and multimedia source 110.

As illustrated in FIG. 2A, the various high speed multimedia signals are generated using a multimedia transmitter 210 and decoded using a multimedia receiver 220. Typically, the transmitter 210 and receiver 220 are implemented in an integrated circuit (IC). The output/input high speed multimedia signals from the transmitter/receiver are carried over conducting wires 230-1 to 230-4, on a printed circuit board (PCB) 240, to a multimedia interface connector 250, e.g., an HDMI connector. Specifically, the wires 230-1, 230-2, and 230-3 are respectively connected to pins 251, 252 and 253 in the connector 250. The pins 251, 252 and 253 are connected to channels carrying high-speed multimedia signals (e.g., the TMDS channels 130-1, 130-2, and 130-3). The wire 230-4 is coupled to the clock's pin 254 of, e.g., the clock channel 140. Typically, each conducting wire 230-1 to 230-4 is a differential pair. As can be noted there is a one-to-one connection between each pin in the connector 250 to its respective output of transmitter's 210 output or an input receiver's 220 input.

The performance of a multimedia interface system, and in particular an HDMI system, strongly depends on the quality of the physical infrastructure carrying the signals between the transmitter 210 and receiver 220. Specifically, if the conducting wires 230 are not directly wired between the output/input of the transmitter/receiver and the connector 250 the quality of the signals, carried over the wires 230-1 to 230-4, is significantly reduced. Specifically, the signal integrity and signal-to-noise-ratio (SNR) of at least high-speed multimedia signals are affected.

As illustrated in FIGS. 2B and 2C, in some cases, the wires 230-1 to 230-4 carrying the high-speed multimedia signals are crossed due to mechanical constraints that determine the locations of the connector 250, transmitter 210, receiver 220. For example, in FIG. 2B, the conducting wires 230-1 to 230-4 are crossed on the PCBs 240 due to the location of the connector 250 and the receiver 220 and transmitter 210. In FIG. 2C, the conducting wires 230-1 to 230-4 between the transmitter 210 and pins of the connector 250 are crossed. Typically, in such designs the signals are routed through different metal layers and vias on the PCBs 240. As a result, the quality of the signals is significantly reduced.

Therefore, it would be advantageous to have a solution that would enable a direct connection between a circuit for processing high-speed multimedia signals and a multimedia connector.

SUMMARY OF THE INVENTION

Certain embodiments of the invention include an apparatus for swapping output high-speed multimedia signals. The apparatus comprises a plurality of inputs coupled to a multimedia transmitter; a plurality of outputs coupled to a plurality of pins of a multimedia interface connector; and a controller for generating a control signal for configuring an order in which the plurality of inputs are routed to the plurality of outputs, wherein the order in which the plurality of inputs are routed to the plurality of outputs is set to enable un-crossing of one or more conducting wires coupling the plurality of inputs to the multimedia transmitter and to enable un-crossing of one or more conducting wires coupling the plurality of outputs and the plurality of pins of the multimedia interface connector.

Certain embodiments of the invention also include an apparatus for swapping input high-speed multimedia signals. The apparatus comprises a plurality of inputs coupled to a multimedia interface connector; a plurality of outputs coupled to a multimedia receiver; and a controller for generating a control signal for configuring an order in which the plurality of inputs are routed to the plurality of outputs, wherein the order in which the plurality of inputs are routed to the plurality of outputs is set to enable un-crossing of one or more conducting wires coupling the plurality of outputs to the multimedia receiver and to enable un-crossing of one or more conducting wires coupling the plurality of inputs and the plurality of pins of the multimedia interface connector.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
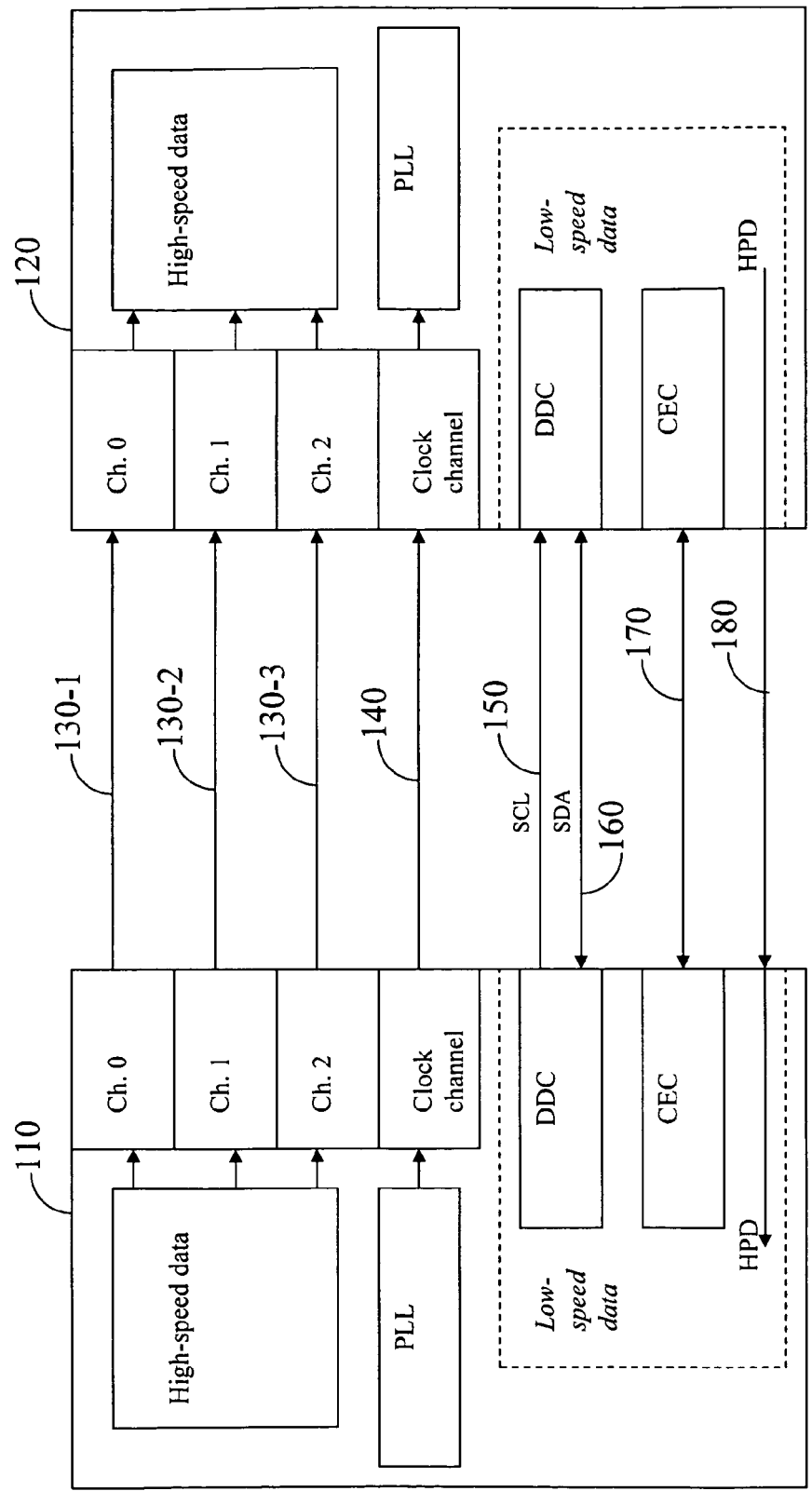
FIG. 1 is a block diagram of an HDMI system.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A method and apparatus that enables point-to-point connections between an integrated circuit (IC) that processes the multimedia signals to a connector is described. Certain embodiments of the method and apparatus enhance the quality of high speed multimedia signals transmitted in multimedia systems. This is performed by internally swapping the multimedia signals without changing the location of the electric circuit board and/or the connector. In a preferred embodiment, the multimedia signals include at least TMDS characters carried over TMDS channels and an HDMI clock sent over a clock channel, where the connector is an HDMI connector.

Figure 3:
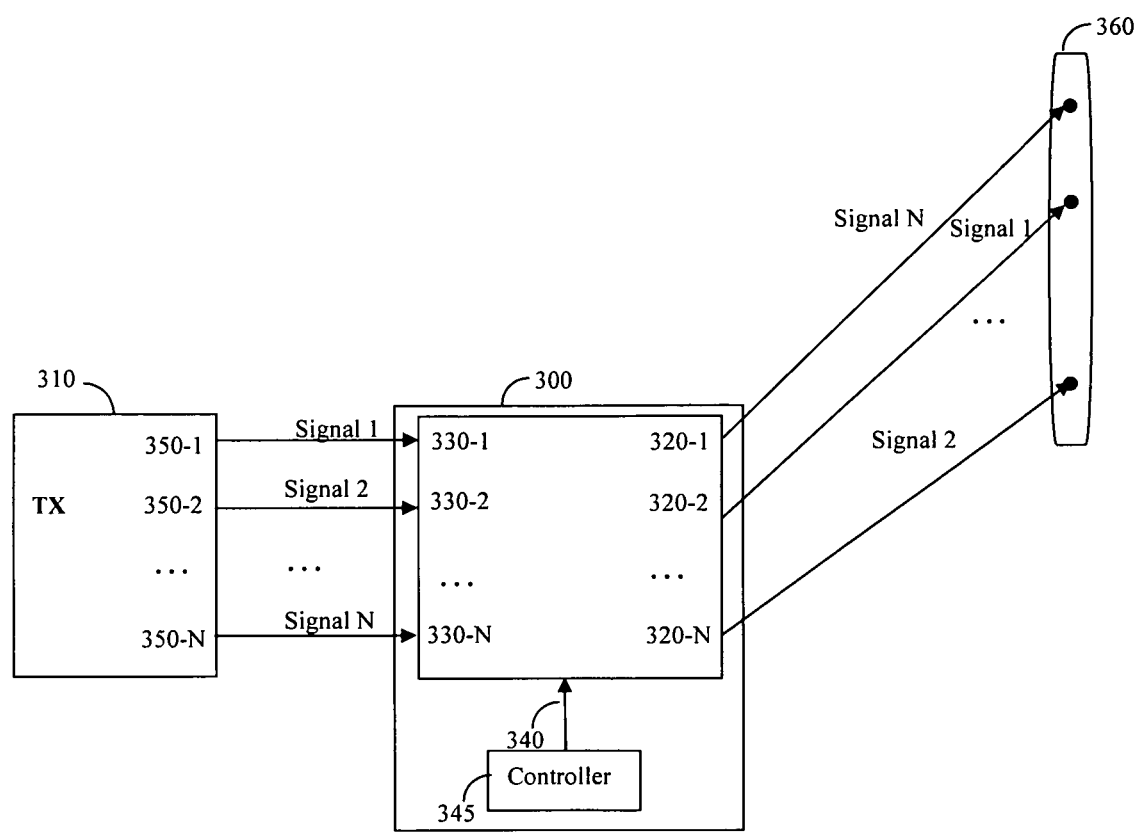
FIG. 3 is an exemplary diagram of an apparatus utilized for swapping transmitted high-speed multimedia signals realized in accordance with an embodiment of the invention.

FIG. 3 shows an exemplary block diagram of an apparatus 300 for swapping transmitted high-speed multimedia signals realized in accordance with an embodiment of the invention. The apparatus 300 includes a number of N inputs 330-1 through 330-N and a number of N outputs 320-1 through 320-N as well as a controller 345 that outputs a control signal 340. The inputs 330-1 through 330-N are directly coupled to the outputs 350-1 through 350-N of a multimedia transmitter 310. That is, there are no cross connections between the transmitter 310 and the apparatus 300. The outputs 320-1 through 320-N are connected to the conducting wires leading to a connector 360 are configurable under the control of the controller 345. That is, the controller 345 outputs a control signal 340 that determines the order in which the inputs 330-1 through 330-N will be routed to the outputs 320-1 through 320-N. For example, the output 320-2 may output a signal at the input 330-1, the input 330-2 may be routed to the output 320-1, and so on. The control signal 340 is generated based on the layout (i.e., a physical location of the connector 360 and transmitter 310). The layout may be pre-programmed at the controller 345. In another embodiment, the controller 345 may run a process that automatically detects the pins' locations at the connector 360 and transmitter 310, and generates the control signal 340 based on the pins' locations. As the outputs 350 of the transmitter 310 are fixed and the position of the connector 360 is also fixed (as determined by the mechanical constraints of the system) the ability to have programmable outputs 320-1 through 320-N allows designing a circuit with uncrossed conducting wires connecting the transmitter 310 and a multimedia interface connector 360.

Figure 2A:
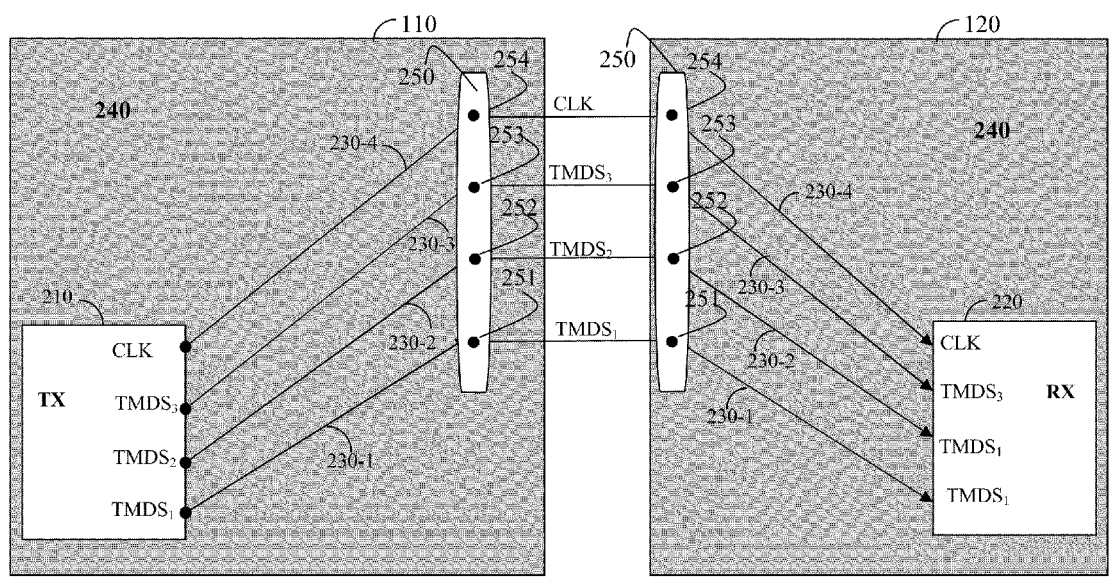
FIG. 2A is a typical wiring of a receiver and transmitter to connectors in a multimedia interface system.
Figure 2B:
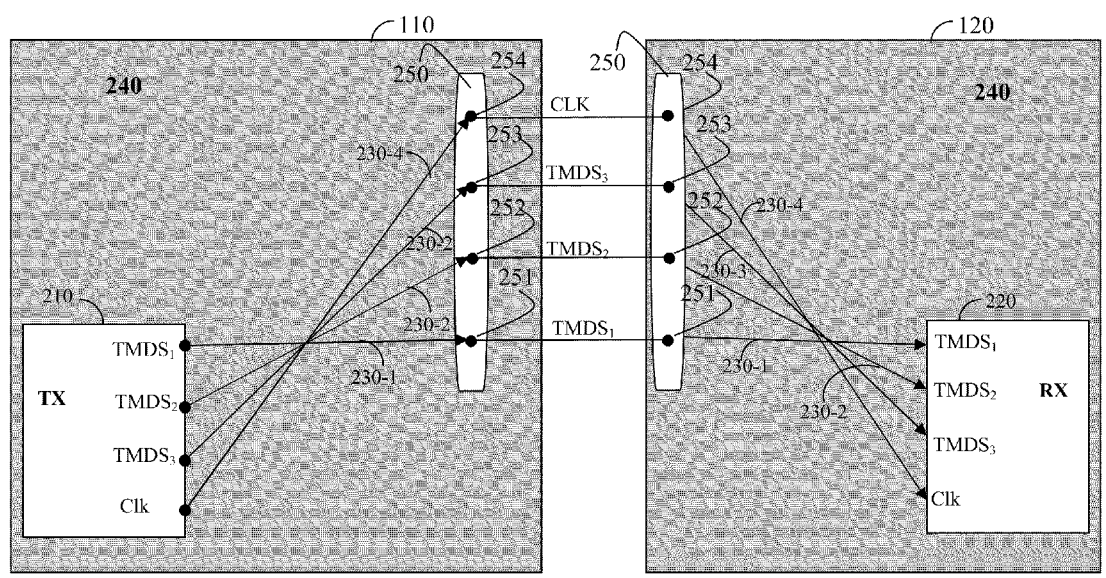
FIGS. 2B and 2C are examples for designs of multimedia interface systems where wires are crossed on PCBs of such systems.
Figure 2C:
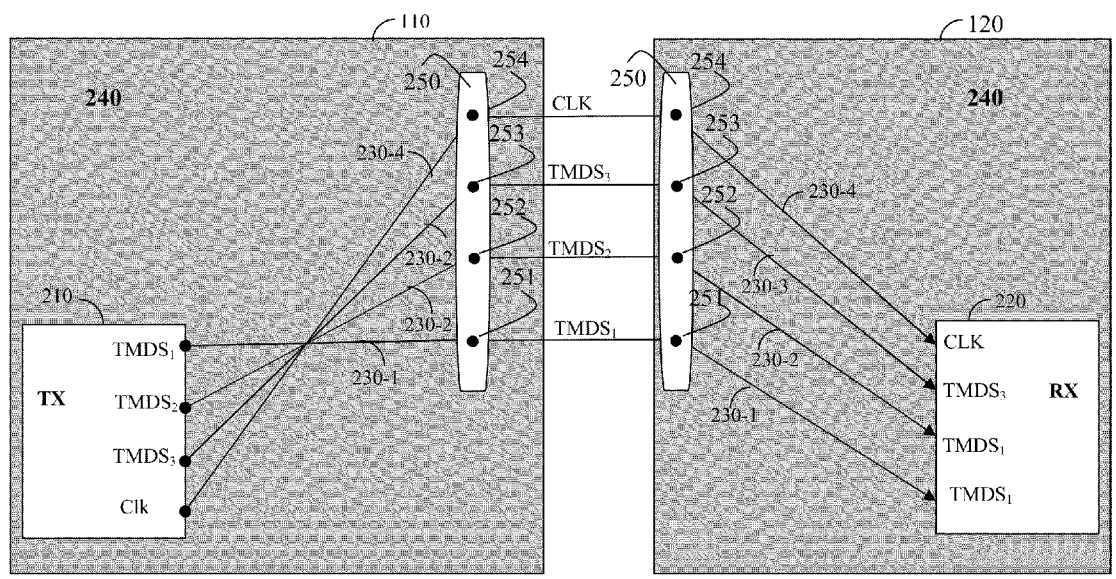
Figure 4:
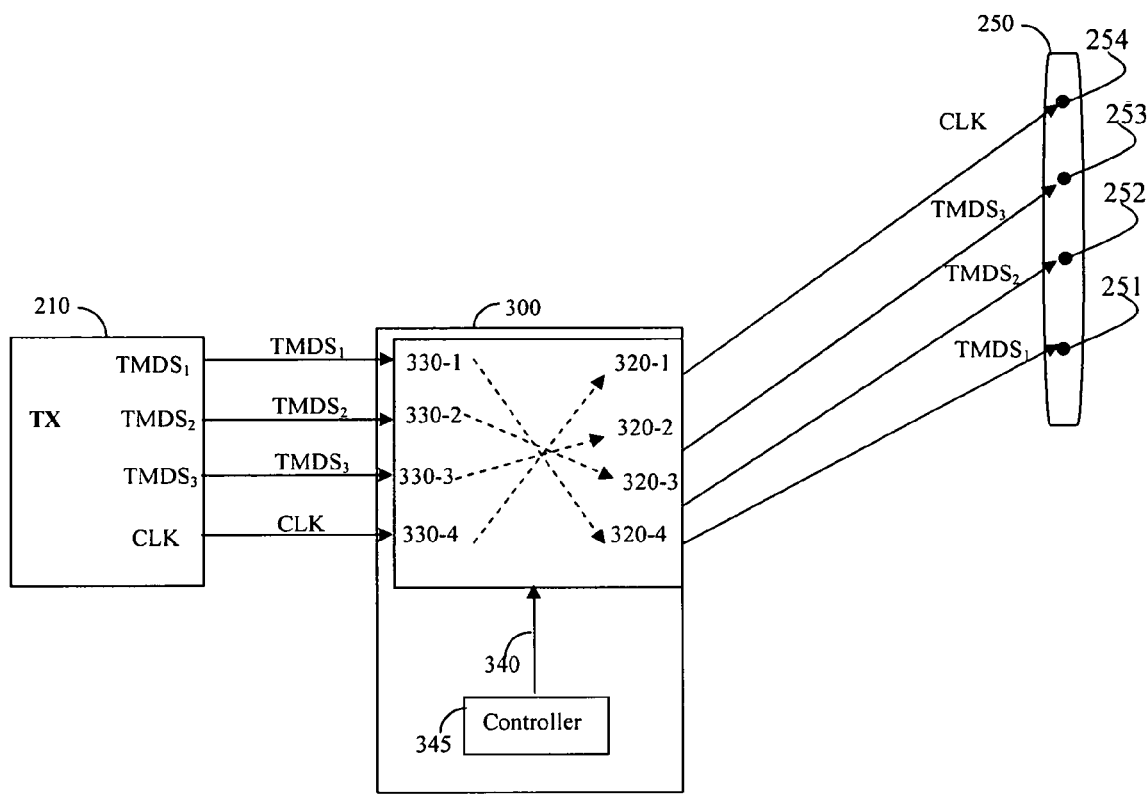
FIG. 4 illustrates how the apparatus shown in FIG. 3 can be utilized for swapping TMDS channels in an HDMI system.

This is further illustrated in FIG. 4 which shows how the apparatus 300 can be utilized to swap TMDS channels of the multimedia interface system shown in FIGS. 2B and 2C. The inputs 330-1, 330-2, 330-3 and 330-4 (of the apparatus 300) are respectively connected to the TMDS channel outputs of the multimedia transmitter 210. The apparatus 300 is configured to swap between the TMDS channels $TMDS_2$ and $TMDS_3$ as well as the TMDS channel $TMDS_1$ and the clock channel. That is, the $TMDS_1$ channel's input 330-1 is now routed to the output 320-4 and the $TMDS_2$ channel's 330-2 is directed to the output 320-3, the $TMDS_3$ channel's input 330-3 is directed to the output 320-2. In addition, the clock channel's input 330-4 is routed to the output 320-1. In one embodiment the apparatus 300 is placed on a PCB between the wiring crossing point and the connector. This allows directly wiring the outputs 320 to the connector's 250 pins, without cross connections. In accordance with an embodiment of the invention, the apparatus 300 may be an analog switch or a digital switch. The apparatus 300 can be integrated in the transmitter 310 or be connected outside of the transmitter or even connected to or integrated with the connector.

Figure 5:
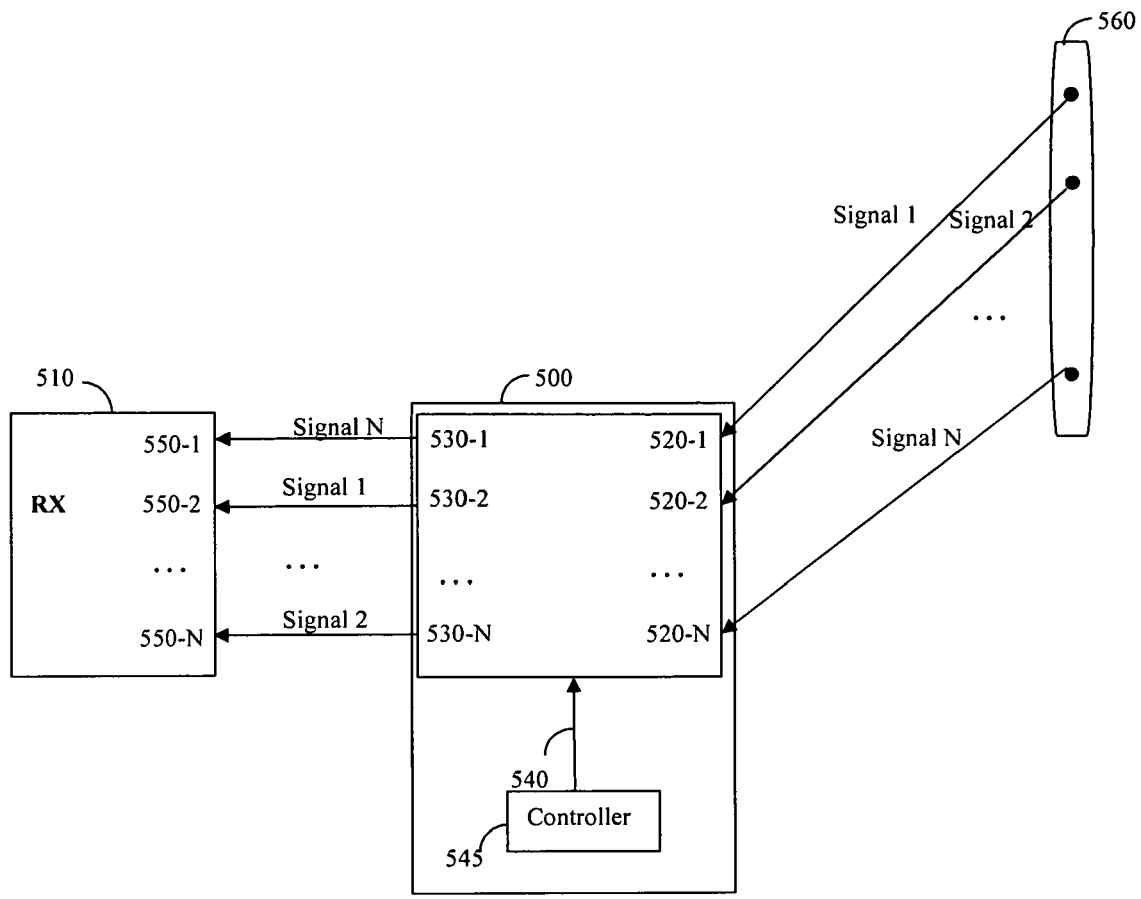
FIG. 5 is an exemplary diagram of an apparatus utilized for swapping received high-speed multimedia signals realized in accordance with an embodiment of the invention.

FIG. 5 shows an exemplary block diagram of an apparatus 500 utilized for swapping input high-speed multimedia signals realized in accordance with an embodiment of the invention. The apparatus includes a number of N inputs 520-1 through 520-N and a number of N outputs 530-1 through 530-N as well as a controller 545 that outputs a control signal 540. The outputs 530 are directly coupled to the inputs 550 of a multimedia receiver 510. That is, there are no cross connections between the receiver 510 and the apparatus 500. The inputs 520 are connected to the conducting wires leading to a multimedia interface connector 560 and are configurable under the control of the controller 545. That is, the controller 545 determines the order in which the inputs 520-1 through 520-N will be routed to the outputs 530-1 through 530-N. For example, a signal at an input 520-1 may be directed to an output 530-2, a signal at an input 520-2 may be routed to an output 530-1, and so on. The control signal 540 is generated based on the layout (i.e., a physical location of the connector 560 and receiver 510). The layout may be pre-programmed at the controller 545. In another embodiment, the controller 545 may run a process that automatically detects the pins' locations at the connector 560 and receiver 510, and generates the control signal 540 based on the pins' locations. As the inputs 550-1 through 550-N of the receiver 510 are fixed and the position of the connector 560 is also fixed (as determined by the mechanical constraints of the system) the ability to have programmable outputs 530-1 through 530-N allows for designing a circuit with uncrossed conducting wires connecting the receiver 510 and the connector 560. In accordance with an embodiment of the invention, the apparatus 500 may be an analog switch or a digital switch. The apparatus 500 can be integrated in the receiver 510 or connected outside the receiver or even connected to or integrated with the connector.

Figure 6:
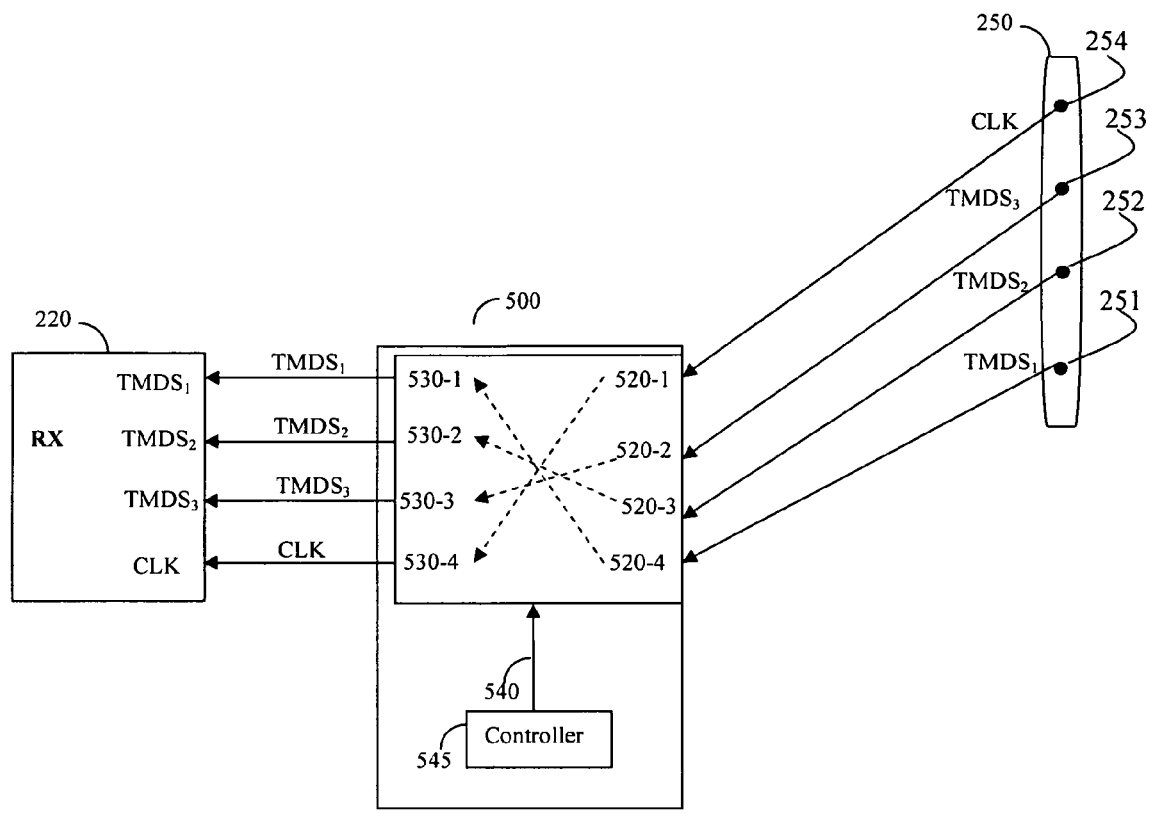
FIG. 6 illustrates how the apparatus described in FIG. 5 can be utilized to swap TMDS channels in an HDMI system.

FIG. 6 depicts how the apparatus 500 can be utilized to swap TMDS channels of the multimedia interface system shown in FIGS. 2B and 2C. In the example, the apparatus 500 is configured to swap between the TMDS channels $TMDS_2$ and $TMDS_3$ as well as the channel $TMDS_1$ and the clock channel. That is, the $TMDS_2$ channel's input 520-3 is now routed to the output 530-2 and the $TMDS_3$ channel's input 520-2 is directed to the output 530-3. Similarly, the clock channel's input 520-1 is forwarded to the output 530-4 and the $TMDS_1$ channel's 520-4 is directed to the output 530-1. This allows directly wiring the inputs 520 to the multimedia interface connector's 250 pins.

In some multimedia interface system designs high-speed multimedia signals are carried over differential pairs, each of which is a pair of conductors. In some cases, due to mechanical constraints, the conductors are twisted over the PCB, thereby degrading the quality of a signal carried over a differential pair. It should be apparent to one of ordinary skill in the art that the teachings disclosed herein can be also utilized to untwist conductors of differential pairs carrying the high-speed multimedia signals. Furthermore, it should be apparent to one of ordinary skill in the art that teachings described herein can be easily adapted to swap multimedia signals of other digital display interface standards, such as a DisplayPort™, and the like.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What I claim is:

1. An apparatus for swapping output high-speed multimedia signals, comprising:
    a plurality of inputs coupled to a multimedia transmitter;
    a plurality of outputs coupled to a plurality of pins of a multimedia interface connector; and
    a controller for automatically detecting an order of the plurality of input pins of the multimedia interface connector and generating a control signal based on the detected order of the pins, wherein the control signal configures an order in which the output high-speed multimedia signals at the plurality of inputs are routed to the plurality of outputs, wherein the order in which the output high-speed multimedia signals at the plurality of inputs are routed to the plurality of outputs is set to route at least one output high-speed multimedia signal to at least one output of the plurality of outputs that is unparallel to its respective at least one input of the plurality of inputs to enable un-crossing of one or more conducting wires coupling the plurality of inputs to the multimedia transmitter and to enable un-crossing of one or more conducting wires coupling the plurality of outputs and the plurality of pins of the multimedia interface connector.

2. The apparatus of claim 1, wherein the high-speed multimedia signals are Transition Minimized Differential Signaling (TMDS) characters transmitted over TMDS channels.

3. The apparatus of claim 1, wherein the multimedia signals further includes a clock signal.

4. The apparatus of claim 1, wherein the high speed multimedia signals are DisplayPort signals transmitted over a plurality of lanes.

5. The apparatus of claim 1, the controller is further capable of generating a control signal adapted to untwist differential pairs connecting the plurality of outputs and the plurality of pins of the multimedia interface connector, wherein a differential pair is a pair of conductors carrying a differential signal.

6. The apparatus of claim 1, is integrated in the multimedia transmitter.

7. The apparatus of claim of 1, is integrated in the multimedia interface connector.

8. An apparatus for swapping input high-speed multimedia signals, comprising:
    a plurality of inputs coupled to a plurality of pins of a multimedia interface connector;
    a plurality of outputs coupled to a multimedia receiver; and
    a controller for automatically detecting an order of the plurality of pins of the multimedia interface connector and generating a control signal based on the detected order of the pins, wherein the control signal configures an order in which the input high-speed multimedia signals at the plurality of inputs are routed to the plurality of outputs, wherein the order in which the input high-speed multimedia signals at the plurality of inputs are routed to the plurality of outputs is set to route at least one input high-speed multimedia signal to at least one output of the plurality of outputs that is unparallel to its respective at least one input of the plurality of inputs to enable un-crossing of one or more conducting wires coupling the plurality of outputs to the multimedia receiver and to enable un-crossing of one or more conducting wires coupling the plurality of inputs and the plurality of pins of the multimedia interface connector.

9. The apparatus of claim 8, wherein the high-speed multimedia signals are TMDS characters transmitted over TMDS channels.

10. The apparatus of claim 8, wherein the multimedia signals further includes a clock signal.

11. The apparatus of claim 8, wherein the high speed multimedia signals are DisplayPort signals transmitted over a plurality of lanes.

12. The apparatus of claim 8, the controller is further capable of generating a control signal adapted to untwist differential pairs connecting the plurality of inputs and the plurality of pins of the multimedia interface connector, wherein a differential pair is a pair of conductors carrying a differential signal.

13. The apparatus of claim of 8, is integrated in the multimedia transmitter.

14. The apparatus of claim of 8, is integrated in the multimedia interface connector.

* * * * *